US011394992B2

(12) United States Patent
Hsiao et al.

(10) Patent No.: US 11,394,992 B2
(45) Date of Patent: *Jul. 19, 2022

(54) METHODS AND APPARATUSES OF GENERATING AVERAGE CANDIDATES IN VIDEO CODING SYSTEMS

(71) Applicant: MEDIATEK INC., Hsin-Chu (TW)

(72) Inventors: Yu-Ling Hsiao, Hsin-Chu (TW);
Tzu-Der Chuang, Hsin-Chu (TW);
Chih-Wei Hsu, Hsin-Chu (TW);
Chun-Chia Chen, Hsin-Chu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,320

(22) Filed: Mar. 7, 2019

(65) Prior Publication Data

US 2019/0289315 A1    Sep. 19, 2019

Related U.S. Application Data

(60) Provisional application No. 62/731,130, filed on Sep. 14, 2018, provisional application No. 62/642,658, filed on Mar. 14, 2018.

(51) Int. Cl.
| | |
|---|---|
| *H04N 19/52* | (2014.01) |
| *H04N 19/176* | (2014.01) |
| *H04N 19/70* | (2014.01) |
| *H04N 19/159* | (2014.01) |
| *H04N 19/107* | (2014.01) |
| *H04N 19/577* | (2014.01) |

(52) U.S. Cl.
CPC .......... *H04N 19/52* (2014.11); *H04N 19/107* (2014.11); *H04N 19/159* (2014.11); *H04N 19/176* (2014.11); *H04N 19/577* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2005/0117646 A1* | 6/2005 | Joch | ...................... | H04N 19/573 375/240.16 |
| 2012/0163466 A1* | 6/2012 | Sugio | ................... | H04N 19/139 375/240.16 |
| 2012/0189062 A1* | 7/2012 | Sugio | ................... | H04N 19/132 375/240.16 |
| 2013/0107958 A1* | 5/2013 | Shimada | ................ | H04N 19/52 375/240.15 |
| 2014/0023144 A1* | 1/2014 | Park | ...................... | H04N 19/52 375/240.16 |

(Continued)

*Primary Examiner* — Mohammed Jebari
(74) *Attorney, Agent, or Firm* — Oblon, McClelland, Maier & Neustadt, L.L.P.

(57) ABSTRACT

Video processing methods and apparatuses for coding a current block by constructing a candidate set including an average candidate generated from two or more original motion candidates. At least one MV of the average candidate is derived by directly averaging MVs of the original motion candidates in one of list 0 and list 1 without scaling regardless whether the MVs are pointing to same or different reference pictures. A selected candidate is determined from the candidate set as a MVP for a current MV of the current block for encoding or decoding the current block.

20 Claims, 7 Drawing Sheets

(56) References Cited

U.S. PATENT DOCUMENTS

| | | | |
|---|---|---|---|
| 2014/0092975 A1* | 4/2014 | Yu | H04N 19/52 |
| | | | 375/240.16 |
| 2014/0140408 A1* | 5/2014 | Lee | H04N 19/65 |
| | | | 375/240.16 |
| 2014/0140409 A1* | 5/2014 | Kim | H04N 19/105 |
| | | | 375/240.16 |
| 2015/0085935 A1* | 3/2015 | Chen | H04N 19/597 |
| | | | 375/240.16 |
| 2016/0366435 A1* | 12/2016 | Chien | H04N 19/52 |
| 2020/0244968 A1* | 7/2020 | Jun | H04N 19/147 |

* cited by examiner

| MergeIdx | L0 | L1 |
|---|---|---|
| 0 | MVL0_a, RefL0_a | |
| 1 | MVL0_b, RefL0_b | MVL1_b, RefL1_b |
| 2 | MVL0_c, RefL0_c | |
| 3 | | MVL1_d, RefL1_d |
| 4 | (MVL0_a+MVL0_b)>>1 | MVL1_b, RefL1_b |
| | | |
| | | |
| | | |

30

MVL0_a
310

314

MVL0_b
312

| MergeIdx | L0 | L1 |
|---|---|---|
| 0 | MVL0_a, RefL0_a | |
| 1 | MVL0_b, RefL0_b | MVL1_b, RefL1_b |
| 2 | MVL0_c, RefL0_c | |
| 3 | | MVL1_d, RefL1_d |
| 4 | (MVL0_a+MVL0_b)>>1 | MVL1_b, RefL1_b |
| 5 | (MVL0_a+MVL0_c)>>1 | |

40

METHODS AND APPARATUSES OF GENERATING AVERAGE CANDIDATES IN VIDEO CODING SYSTEMS

CROSS REFERENCE TO RELATED APPLICATIONS

The present invention claims priority to U.S. Provisional Patent Application Ser. No. 62/642,658, filed on Mar. 14, 2018, entitled "Method for Generating Average MVPs or Average Merge Candidates in Video Coding" and U.S. Provisional Patent Application Ser. No. 62/731,130, filed on Sep. 14, 2018, entitled "Spatial Motion Vector Retrieving Method and Average MVPs or Average Merge Candidates Generating in Video Coding". The U.S. Provisional Patent Applications are hereby incorporated by reference in their entireties.

FIELD OF THE INVENTION

The present invention relates to video processing methods and apparatuses in video encoding and decoding systems. In particular, the present invention relates to generating an average candidate from original motion candidates in a candidate set for inter picture prediction.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in HEVC. In the HEVC main profile, minimum and the maximum sizes of a CTU are specified by syntax elements signaled in the Sequence Parameter Set (SPS). A raster scan order is used to encode or decode CTUs in each slice. Each CTU may contain one Coding Unit (CU) or recursively split into four smaller CUs according to a quad-tree partitioning structure until a pre-defined minimum CU size is reached. At each depth of the quad-tree partitioning structure, an N×N block is either a single leaf CU or split into four blocks of sizes N/2×N/2, which are coding tree nodes. If a coding tree node is not further split, it is the leaf CU. The leaf CU size is restricted to be larger than or equal to the predefined minimum CU size, which is also specified in the SPS.

The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation in inter picture prediction identifies one (uni-prediction) or two (bi-prediction) best reference blocks for a current block in one or two reference picture, and motion compensation in inter picture prediction locates the one or two best reference blocks according to one or two motion vectors (MVs). A difference between the current block and a corresponding predictor is called prediction residual. The corresponding predictor is the best reference block when uni-prediction is used. When bi-prediction is used, the two reference blocks are combined to form the predictor. The prediction residual belong to a CU is split into one or more Transform Units (TUs) according to another quad-tree block partitioning structure for transforming residual data into transform coefficients for compact data representation. The TU is a basic representative block for applying transform and quantization on the residual data. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two dimensional sample array of one color component associated with the CTU, CU, PU, and TU respectively. For example, a CTU consists of one luma CTB, two corresponding chroma CTBs, and its associated syntax elements. In the HEVC system, the same block partitioning structure is generally applied to both luma and chroma components unless a minimum size for chroma block is reached. For example, a 2×2 chroma TB is not allowed when the corresponding luma TB is 4×4 for a 4:2:0 color format since the minimum TB size for both luma and chomra blocks is 4×4. Another exception of applying same block partitioning structure occurs when processing intra coded chroma CBs, where an intra chroma CBs always contains a single intra chroma PB regardless the number of intra luma PBs in the corresponding intra luma CB.

For an intra coded CU containing a luma CB and two chroma CBs, the luma CB is predicted by one or four luma PBs, whereas each of the two chroma CBs is always predicted by one chroma PB. Each luma PB in the intra CU selects one intra luma prediction mode out of 35 modes and the two chroma PBs in the intra CU share one intra chroma prediction mode. In addition to 33 directional intra prediction modes, DC and Planar modes are supported to predict flat regions and gradually varying regions, respectively. Moreover, the size of each TB in the intra coded CU is restricted to be smaller than the size of the corresponding PB.

There are three inter picture prediction modes in HEVC, including Inter, Skip, and Merge modes. Motion vector prediction is used in these inter picture prediction modes to reduce bits required for motion information coding. The motion vector prediction process includes generating a candidate set including multiple spatial and temporal motion candidates and pruning the candidate set to remove redundancy. A Motion Vector Competition (MVC) scheme is applied to select a final motion candidate among the candidate set. Inter mode is also referred to as Advanced Motion Vector Prediction (AMVP), where inter prediction indicators, reference picture indices, Motion Vector Differences (MVDs), and prediction residual are transmitted when encoding a PU in Inter mode. The inter prediction indicator of a PU describes the prediction direction such as list 0 prediction, list 1 prediction, or bi-directional prediction. An index is also transmitted for each prediction direction to select one motion candidate from the candidate set. A default candidate set for the Inter mode includes two spatial motion candidates and one temporal motion candidate. FIG. 1 illustrates locations of the motion candidates for deriving a candidate set for a PB 10 coded in Inter mode. The two spatial motion candidates in the candidate set include a left candidate and a top candidate. The left candidate for the current PB 10 is searched from below left to left, from predictor $A_0$ 111 to predictor $A_1$ 112, and the first available predictor is selected as the left candidate, while the top candidate is searched from above right to above left, from predictor $B_0$ 113, to predictor $B_1$ 114, and then predictor $B_2$ 115, and the first available predictor is selected as the top candidate. The temporal motion candidate is the first available predictor selected from predictors $T_{BR}$ 121 and $T_{CTR}$ 122 in a temporal collocated picture. The temporal collocated picture is indicated by signaling a flag and a reference index in a slice header to specify which reference picture list and which reference picture in the reference picture list is used. The predictors $T_{BR}$ and $T_{CTR}$ are located at below right and center of a reference location 12 in the temporal collocated picture.

To increase the coding efficiency of motion information coding in Inter mode, Skip and Merge modes were proposed and adopted in the HEVC standard to further reduce the data bits required for signaling motion information by inheriting motion information from a spatially neighboring block or a temporal collocated block. For a PU coded in Skip or Merge mode, only an index of a selected final candidate is coded instead of the motion information, as the PU reuses the motion information of the selected final candidate. The motion information reused by the PU includes a motion vector (MV), an inter prediction indicator, and a reference picture index of the selected final candidate. It is noted that if the selected final candidate is a temporal motion candidate, the reference picture index is always set to zero. Prediction residual are coded when the PU is coded in Merge mode, however, the Skip mode further skips signaling of the prediction residual as the residual data of a PU coded in Skip mode is forced to be zero.

A Merge candidate set consists of four spatial motion candidates and one temporal motion candidate. As shown in FIG. 1, the first Merge candidate is a left predictor $A_1$ 112, the second Merge candidate is a top predictor $B_1$ 114, the third Merge candidate is a right above predictor $B_0$ 113, and a fourth Merge candidate is a left below predictor $A_0$ 111. A left above predictor $B_2$ 115 is included in the Merge candidate set to replace an unavailable spatial predictor. A fifth Merge candidate is a temporal predictor of first available temporal predictors $T_{BR}$ 121 and $T_{CTR}$ 122. The encoder selects one final candidate from the candidate set for each PU coded in Skip or Merge mode based on MVC such as through a rate-distortion optimization (RDO) decision, and an index representing the selected final candidate is signaled to the decoder. The decoder selects the same final candidate from the candidate set according to the index transmitted in the video bitstream.

A pruning process is performed after deriving the candidate set for Inter, Merge, or Skip mode to check the redundancy among candidates in the candidate set. After removing one or more redundant or unavailable candidates, the size of the candidate set could be dynamically adjusted at both the encoder and decoder sides, and an index for indicating the selected final candidate could be coded using truncated unary binarization to reduce the required data bits. However, although the dynamic size of the candidate set brings coding gain, it also introduces a potential parsing problem. A mismatch of the candidate set derived between the encoder side and the decoder side may occurred when a MV of a previous picture is not decoded correctly and this MV is selected as the temporal motion candidate. A parsing error is thus present in the candidate set and it can propagate severely. The parsing error may propagate to the remaining current picture and even to the subsequent inter coded pictures that allow temporal motion candidates. In order to prevent this kind of parsing error propagation, a fixed candidate set size is used to decouple the candidate set construction and index parsing at the encoder and decoder sides. In order to compensate the coding loss caused by the fixed candidate set size, additional candidates are assigned to the empty positions in the candidate set after the pruning process. The index for indicating the selected final candidate is coded in truncated unary codes of a maximum length, for example, the maximum length is signaled in a slice header for Skip and Merge modes, and is fixed to 2 for AMVP mode in HEVC.

For a candidate set constructed for a block coded in Inter mode, a zero vector motion candidate is added to fill an empty position in the candidate set after derivation and pruning of two spatial motion candidates and one temporal motion candidate according to the current HEVC standard. As for Skip and Merge modes in HEVC, after derivation and pruning of four spatial motion candidates and one temporal motion candidate, two types of additional candidates are derived and added to fill the empty positions in the candidate set if the number of available candidates is smaller than the fixed candidate set size. The two types of additional candidates used to fill the candidate set include a combined bi-predictive motion candidate and a zero vector motion candidate. The combined bi-predictive motion candidate is created by combining two original motion candidates already included in the candidate set according to a predefined order. An example of deriving a combined bi-predictive motion candidate for a Merge candidate set is illustrated in FIG. 2. The Merge candidate set 22 in FIG. 2 only has two motion candidates mvL0_A with ref0 in list 0 and mvL1_B with ref0 in list 1 after the pruning process, and these two motion candidates are both uni-predictive motion candidates, the first motion candidate mvL0_A predicts the current block in the current picture 262 from a past picture L0R0 264 (reference picture 0 in List 0) and the second motion candidate mvL1_B predicts the current block in the current picture 262 from a future picture L1R0 266 (reference picture 0 in List 1). The combined bi-predictive motion candidate combines the first and second motion candidates to form a bi-predictive motion vector with a motion vector points to a reference block in each list. The predictor of this combined bi-predictive motion candidate is derived by averaging the two reference blocks pointed by the two motion vectors. The updated candidate set 24 in FIG. 2 includes this combined bi-predictive motion candidate as the third motion candidate (MergeIdx=2). After adding the combined bi-predictive motion candidate in the candidate set for Skip or Merge mode, one or more zero vector motion candidates may be added to the candidate set when there are still one or more empty positions.

BRIEF SUMMARY OF THE INVENTION

Methods of video processing in a video coding system utilizing a motion vector predictor (MVP) for coding a motion vector (MV) of a block coded in inter picture prediction such as Inter, Merge, or Skip mode, comprise receiving input data associated with a current block in a current picture, deriving a current candidate set for the current block based on motion candidates associated with one or more neighboring blocks of the current block. For example, the current candidate set includes multiple spatial motion candidates derived from spatial neighboring blocks and one temporal motion candidate derived from a temporal neighboring block. Each motion candidate in the current candidate set includes one MV pointing to a reference picture associated with list 0 or list 1 for uni-prediction, or each motion candidate includes one MV pointing to a reference picture associated with list 0 and another MV pointing to a reference picture associated with list 1 for bi-prediction. The methods comprise deriving an average candidate from two or more original motion candidates in the current candidate set. The average candidate may have one MV for uni-prediction or two MVs for bi-prediction. At least one MV of the average candidate is derived directly from averaging MVs of the motion candidates in one of list 0 and list 1 without scaling, and the MVs of the motion candidates in one of list 0 and list 1 are pointing to a same reference picture or different reference pictures. The average candidate is then included in the current candidate set, and one selected candidate is determined from the current candidate set as a MVP for coding a current MV of the current block. The current block is encoded or decoded in inter picture prediction such as Inter, Merge, or Skip mode utilizing the MVP. A MV difference (MVD) between the MVP and the current MV is signaled along with an index indicating the MVP and prediction residual for the current block coded in Inter mode. An index indicating the MVP selected from the modified candidate set along with the prediction residual of the current block are signaled for the current block coded in Merge mode, and the index indicating the MVP is signaled without the prediction residual for the current block coded in Skip mode.

In some embodiments, the average candidate is derived from a uni-predictive motion candidate with a MV in a first list and a bi-predictive motion candidate with MVs in both first and second lists. The MV of the average candidate in the first list is derived by averaging the MVs of the two candidates in the first list without scaling, and the MV of the average candidate in a second list is set as the MV of the bi-predictive motion candidate in the second list. The first and second list correspond to list 0 and list 1 respectively, or list 1 and list 0 respectively. In another embodiment, the MV of the average candidate in the second list is derived by averaging the MV of the bi-predictive motion candidate in the second list and the MV of the uni-predictive motion candidate in the first list without scaling. In yet another embodiment, the MV of the average candidate in the second list is derived by averaging the MV of the bi-predictive motion candidate in the second list and the MV of the bi-predictive motion candidate in the first list without scaling. In yet another embodiment, the average candidate generated from the first and second candidates is a uni-predictive candidate with a MV only in the first list.

In some embodiments, an average candidate is derived from two uni-predictive motion candidates. For example, when both uni-predictive motion candidates have an existing MV in a first list. The average candidate in this example according to an embodiment is also a uni-predictive motion candidate with a MV in the first list. The MV of the average candidate is generated by averaging the MVs of the two candidates in the first list without scaling. The first list corresponds to list 0 or list 1. In another embodiment, the average candidate generated from two uni-predictive motion candidates is a bi-predictive motion candidate. If both the two uni-predictive motion candidates have a MV in the first list, the MV of the average candidate in the first list is derived by averaging the MVs of the two candidates in the first list without scaling, while the MV of the average candidate in a second list is derived by averaging the MVs of the two candidates in the first list without scaling. If one uni-predictive motion candidate has MV in a first list and another uni-predictive motion candidate has MV in a second list, the MV of the average candidate in the first list is assigned as the MV of the uni-predictive motion candidate that has a MV in the first list, and the MV of the average candidate in the second list is assigned as the MV of the uni-predictive motion candidate that has a MV in the second list. In an embodiment of deriving an average candidate from two bi-predictive motion candidates, the MVs of the average candidate in a first list and a second list are derived by averaging the MVs of the two candidates in the first list and the second list without scaling.

When an average candidate is derived from two or more original motion candidates, the MV of the average candidate in a first list may be pointing to a same reference picture as the MV of one of the original motion candidates in the first list, where the first list corresponds to list 0 or list 1. Alternatively, the MV of the average candidate in the first list may be pointing to a target reference picture, and a target reference picture index representing the target reference picture is either predefined, explicitly transmitted in a video bitstream, or implicitly derived from MVs of the original motion candidates. For example, the target reference picture index is derived as the majority of the reference picture indexes of the original motion candidates.

In a variation of the video processing method, an average candidate is derived from a group of all spatial candidates in the current candidate set, a group of all temporal candidates in the current candidate set, a group of all affine candidates in the current candidate set, or a combination thereof.

In some embodiments, an average candidate is derived by original motion candidates in the current candidate set with a MV pointing to a target reference picture. For example, all the original motion candidates with a MV pointing to reference picture 0 in list 0 are selected to generate the average candidate. The target reference picture is predefined, explicitly signaled in a video bitstream, or implicitly derived from original motion candidates of the current candidate set.

Some embodiments reduce complexity of average candidate generation by reducing two-dimensional motion calculation to one-dimensional motion calculation, that is only one of horizontal and vertical components of the average candidate is calculated by averaging corresponding horizontal or vertical components of the motion candidates. In one embodiment, the other of horizontal and vertical components of the average candidate is set to the other of horizontal and vertical components of one of the motion candidates.

An embodiment of the video processing method derives an average candidate for all candidate pairs with MVs pointing to a same reference picture in at least one list unless the current candidate set or the modified candidate set is full.

In some embodiments of deriving an average candidate from multiple motion candidates, the MV of the average candidate is calculated by weighted averaging the MVs of the motion candidates. An embodiment of weighted averaging MVs assigns a weight to each motion candidate in accordance with a reference picture of the motion candidate with respect to a target reference picture of the average candidate. For example, a higher weight is assigned to a motion candidate with a reference picture the same as the target reference picture of the average candidate, and a lower weight is assigned to a motion candidate with a reference picture different from the target reference picture of the average candidate. Another embodiment of weighted averaging MVs assigns different weights to spatial candidates and temporal candidates, for example, a higher weight is assigned to a spatial candidate than the weight assigned to a temporal candidate.

Aspects of the disclosure further provide an apparatus for video processing in a video coding system utilizing a MVP for coding a MV of a block coded in Inter picture prediction. The apparatus comprises one or more electronic circuits configured for receiving input data of a current block in a current picture, deriving a current candidate set having multiple motion candidates for the current block, deriving an average candidate from at least two motion candidates in the current candidate set, including the average candidate in the current candidate set, determining a selected candidate from the current candidate set as a MVP for a current MV of the current block, and encoding or decoding the current block utilizing the MVP. At least one MV of the average candidate is derived directly from averaging MVs of the motion candidates in one of list 0 and list 1 without scaling.

Aspects of the disclosure further provide a non-transitory computer readable medium storing program instructions for causing a processing circuit of an apparatus to perform a video processing method to encode or decode a current block utilizing a MVP selected from a candidate set, where the candidate set includes one or more average candidate. At least one MV of the average candidate is derived from averaging MVs of at least two original motion candidates in the candidate set in one of list 0 and list 1 without scaling. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Embodiments of the present invention provide new methods of generating one or more average candidates to be added to a candidate set for encoding or decoding a current block coded in inter picture prediction. The current block is a PU or a leaf CU. In the following, a candidate set is used to represent an AMVP candidate set or a Merge candidate set, which is constructed for encoding or decoding a block coded in inter picture prediction such as Inter mode, Merge mode, Skip mode, or Direct mode. One or more average candidates of the present invention may be included in the candidate set according to a predefined order before or after the pruning process. For example, an average candidate is added to an empty position of a Merge candidate set after pruning of four spatial motion candidates and one temporal motion candidate. Another average candidate or a zero vector motion candidate may be added to the Merge candidate set if the Merge candidate set is not full after adding the first average candidate. One final candidate is selected from the candidate set as a Motion Vector Predictor (MVP) by Motion Vector Competition (MVC) such as a Rate Distortion Optimization (RDO) decision at the encoder side or by an index transmitted in the video bitstream at the decoder side, and the current block is encoded or decoded by deriving a predictor according to motion information of the MVP. A MV difference (MVD) between the MVP and a current MV respectively along with an index indicating the MVP and prediction residual of the current block are signaled for the current block coded in Inter mode. An index indicating the MVP along with the prediction residual of the current block is signaled for the current block coded in Merge mode, and only the index indicating the MVP is signaled for the current block coded in Skip mode.

Figure 1:
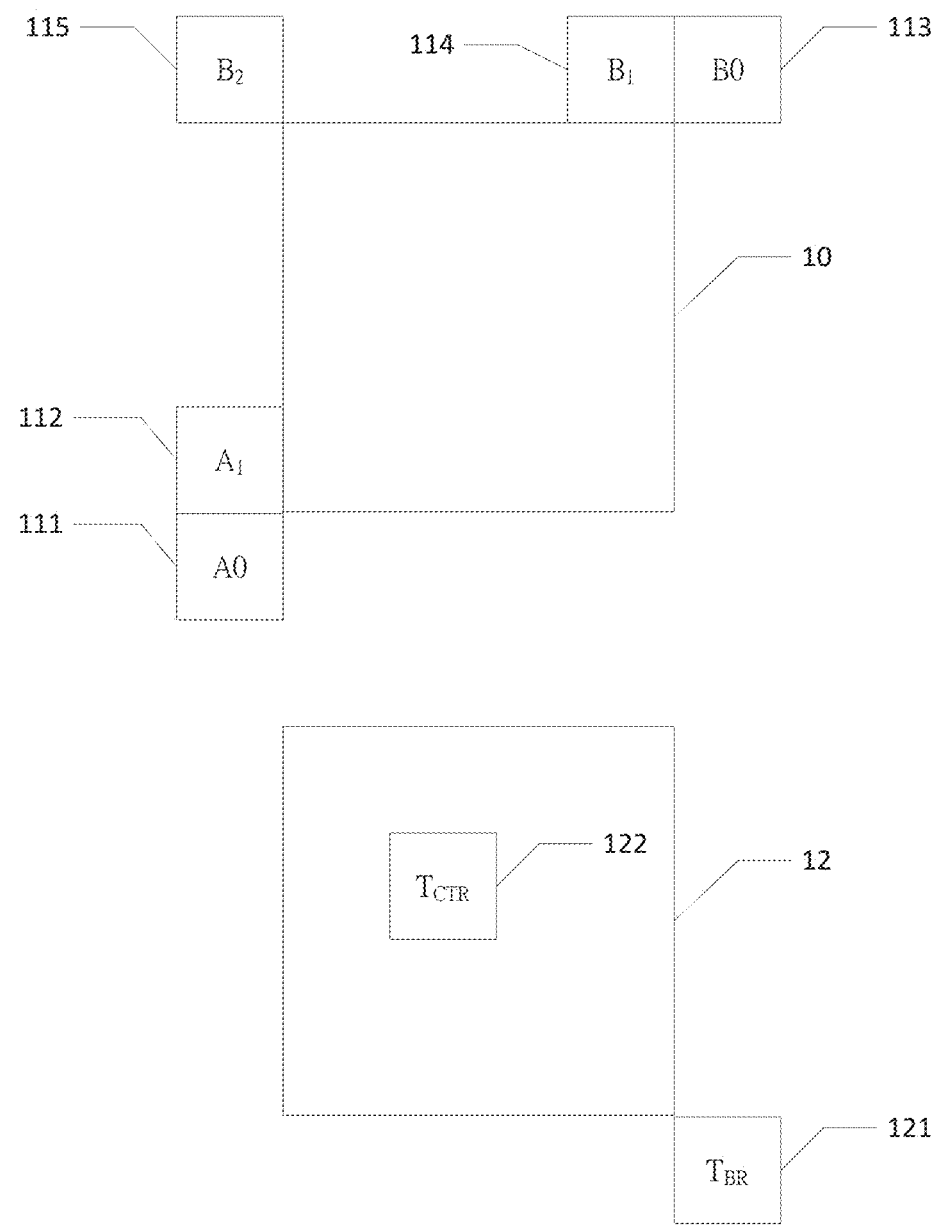
FIG. 1 illustrates locations of spatial predictors and temporal predictors for constructing a candidate set for Inter mode or Merge mode defined in the HEVC standard.
Figure 2:
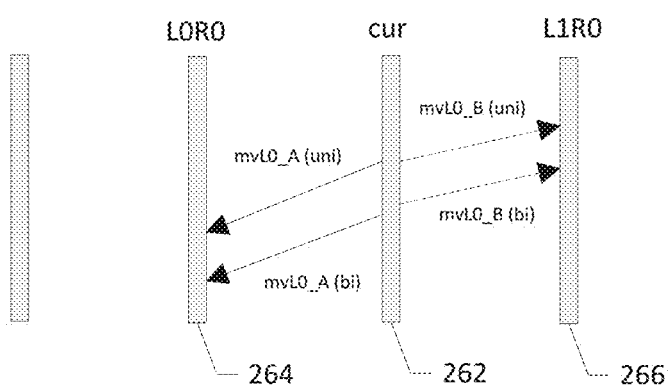
FIG. 2 illustrates an example of deriving a combined bi-predictive motion candidate from two existing uni-directional motion candidates in a candidate set.
Figures 3, 4:
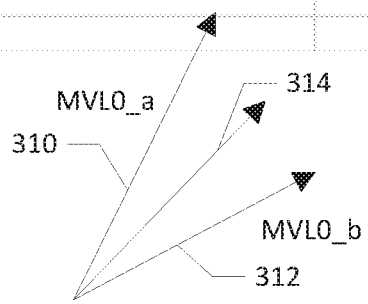
FIG. 3 illustrates an example of generating an average candidate by averaging motion information of first and second existing motion candidates (MergeIdx=0 and 1) in a candidate set.
FIG. 4 illustrates an example of generating two average candidates by averaging motion information of first and second motion candidates (MergeIdx=0 and 1) and motion information of first and third motion candidates (MergeIdx=0 and 2) in a candidate set.

First Embodiment In a first embodiment of the present invention, an average candidate is generated as a mean value of motion vectors of two or more available motion candidates in a candidate set according to a predefined order. FIG. 3 illustrates an example of deriving an average candidate by averaging two original motion candidates. An example is shown in FIG. 3, where motion candidates with a Merge index equals 0 to 3 (MergeIdx {0-3}) are original motion candidates in the candidate set 30 and the candidate with MergeIdx equals to 4 is derived according to an example of the first embodiment. In this example, the average candidate is generated from first and second motion candidates (MergeIdx=0 and MergeIdx=1). The list 0 MV of the average candidate 314 is derived as the average (such as a mean value) of the list 0 MV of the first motion candidate MVL0_$a$ 310 and list 0 MV of the second motion candidate MVL0_$b$ 312 without scaling. The reference picture of the average candidate may be set to equal to the reference picture of the first candidate or the second candidate, or the reference picture may be set to a target reference picture. For example, the reference picture index of the average candidate is set to RefL0_$a$ or RefL0_$b$, or the reference picture index of the average candidate is set to reference index 0 in list 0. A MV pointing to the same reference picture as the reference picture of the average candidate is not scaled before averaging, and a MV pointing to a different reference picture is also not scaled before averaging in order to reduce computational complexity. A target reference picture index representing the target reference picture for the average candidate could be predefined, or explicitly transmitted in the video bitstream, or implicitly derived from MVs of a group of candidates. For example, the target reference picture index is derived as the majority, minimum, or maximum of the reference indexes from the group of motion candidates.

In this embodiment, when the reference picture index RefL0_$a$ of the first candidate and the reference picture index RefL0_$b$ of the second candidate are the same, the two list 0 MVs are directly averaged and the list 0 reference picture for the average candidate is the same as the list 0 reference picture of the first and second candidates (i.e. RefL0_$a$=RefL0_$b$). When the reference picture index RefL0_$a$ of the first candidate is different from the reference picture index RefL0_$b$ of the second candidate, the list 0 MV of the average candidate is also derived directly from averaging the list 0 MV of the first motion candidate MVL0_$a$ and the list 0 MV of the second motion candidate MVL0_$b$ without scaling MVL0_$a$ and MVL0_$b$. The list 0 reference picture of the average candidate is set to the list 0 reference picture of the first candidate or the second candidate.

For list 1, since there is no list 1 MV in the first candidate of the candidate set 30, the list 1 MV of the average candidate in this embodiment is set to the list 1 MV of the second candidate MVL1_$b$, and the list 1 reference picture index of the average candidate is set to the list 1 reference picture index of the second candidate RefL1_$b$.

For an average candidate derived from two bi-predictive motion candidates, the MVs of the average candidate in a first list and a second list may be derived by averaging the MVs of the two candidates in the first list and the second list without scaling.

Second Embodiment In a second embodiment, two original motion candidates for generating an average candidate are both uni-predictive motion candidates having MVs in the same list. The resulting average candidate in this embodiment is also a uni-predictive motion vector with a MV in the same list as the MVs of the original motion candidates. FIG. 4 illustrates an exemplary candidate set 40 having four original motion candidates with a Merge index equals 0 to 3 (MergeIdx {0-3}), and two average candidates (MergeIdx=4 and MergeIdx=5) generated from a first candidate (MergeIdx=0) and a second candidate (MergeIdx=1) according to the first embodiment, and from the first candidate (MergeIdx=0) and a third candidate (MergeIdx=2) according to the second embodiment, respectively. The average candidate with Merge index 4 is a bi-predictive motion candidate whereas the average candidate with Merge index 5 is a uni-predictive motion candidate. The first and third candidates both have motion vectors in list 0, so the corresponding average candidate only has motion information in list 0. The list 0 MV of the average candidate is a mean value of the list 0 MV of the first candidate and the list 0 MV of the third candidate. This average candidate has no motion information in list 1 since none of the first and third candidates has existing MV in list 1. The reference picture of the average candidate may be set to one of the reference pictures of the first and third candidates, or it may be set to a target reference picture implicitly determined or explicitly signaled. In a case when the average candidate is generated from two uni-predictive motion candidates, and the two uni-predictive motion candidates have motion information in different lists, the MV of the average candidate in a first list is assigned as the MV of the uni-predictive motion candidate that has an existing MV in the first list, and the MV of the average candidate in the second list is assigned as the MV of the uni-predictive motion candidate that has an existing MV in the second list. The first and second lists correspond to list 0 and list 1 respectively, or list 1 and list 0 respectively.

Figure 5:
FIG. 5 illustrates another example of generating an average candidate by averaging motion information of first and second existing motion candidates (MergeIdx=0 and 1) in a candidate set.

Third Embodiment FIG. 5 illustrates an example of generating an average candidate according to a third embodiment. The third embodiment provides several alternative methods to the first embodiment for generating an average candidate from one uni-predictive motion vector and one bi-predictive motion vector. The candidates with MergeIdx {0-3} are the original candidates in the candidate set 50 and the candidate with MergeIdx=4 is one example of the average candidate of the third embodiment generated from the first two original candidates: the first candidate is a uni-predictive motion candidate and the second candidate is a bi-predictive motion candidate. The list 0 MV of the average candidate in FIG. 5 is a mean value of the list 0 MVs of the first two candidates, and the list 1 MV of the average candidate is derived by averaging the list 1 MV of the second candidate MVL1_$b$ and the list 0 MV of the first candidate MVL0_$a$. In another example of the third embodiment, the list 1 MV of the average candidate is derived by averaging the list 1 MV of the second candidate MVL1_$b$ and the list 0 MV of the second candidate MVL0_$b$. In the third embodiment, the list 1 reference picture index of the average candidate may be set to the list 1 reference picture index of the second candidate RefL1_$b$ or a given target reference picture index.

In the above examples, the average candidate is a bi-predictive motion vector having motion information in both list 0 and list 1 when at least one original motion candidate used to generate the average candidate is a bi-predictive motion vector. In another example of the third embodiment, the average candidate generated from multiple original motion candidates has only one prediction direction when at least one original candidate is a uni-predictive motion vector or when only one original candidate is a bi-predictive motion vector. For example, if an original motion candidate for generating an average candidate has no motion in one list, the reference picture index of the average candidate in that particular list is set to invalid and the corresponding MV is set to zero. If the first and second candidates in FIG. 5 are used to derive an average candidate according to this example, the list 1 reference picture index of the average candidate is set to invalid and the list 1 MV of the average candidate is set to zero, which implies the average candidate only has motion information in list 0.

Figure 6:
FIG. 6 illustrates another example of generating two average candidates by averaging motion information of first and second motion candidates (MergeIdx=0 and 1) and motion information of first and third motion candidates (MergeIdx=0 and 2) in a candidate set.

Fourth Embodiment A fourth embodiment provides an alternative method to the second embodiment, which handles the average candidate generated from two or more uni-predictive motion candidates having motion vectors in the same list. FIG. 6 shows an example of deriving two average candidates from four original candidates. The candidate set 60 in FIG. 6 includes a first average candidate (MergeIdx=4) generated from first and second original candidates (MergeIdx=0 and MergeIdx=1) according to an example of the third embodiment, and a second average candidate (MergeIdx=5) generated from the first and third original candidates (MergeIdx=0 and MergeIdx=2) according to an example of the fourth embodiment. The list 0 MV of the second average candidate is a mean value of list 0 MVs of the first and third candidates, and the list 0 reference picture is set to equal to the list 0 reference picture of the first or third candidate. For list 1, since there is no list 1 MV in both candidates, the reference picture index of the average candidate is set to a given target reference picture index and the list 1 MV is derived by averaging the list 0 MVs of the first and third candidates.

Average Candidate Derived From A Group Of Candidates An average candidate in some embodiments is derived as a mean value of MVs from a group of candidates. The group of candidates can be a group of all spatial candidates, a group of all temporal candidates, a group of all affine candidates, or a combination of the above groups such as a group of all spatial and temporal candidates. In one example, the average candidate is derived as a mean value of MVs pointing to a given target reference picture from a group of candidates. For example, the list X (X=0 or 1) MV of the average candidate is derived as a mean motion vector of the list X MVs from a group of candidates that pointing to a given reference picture, such as the reference picture with index 0 in list X. The given target reference picture index is predefined, or explicitly transmitted in the video bitstream, or implicitly derived from the MVs of the groups of candidates, such as the majority, minimum, or maximum of the reference picture indexes from the group of candidates.

In another embodiment, the average candidate generated from a group of candidates is derived as a mean motion vector of scaled MVs from the group of candidates. For example, all MVs are scaled to a target reference picture before averaging. The given target reference picture index for the average candidate is predefined, or explicitly transmitted in the video bitstream, or implicitly derived from the MVs of the groups of candidates, such as the majority, minimum, or maximum of the reference picture indexes from the group of candidates.

In some embodiments, if any candidate in a group of candidates has no MV in one list (e.g. list 0), the MV of the other list (e.g. list 1) may be used in this list (e.g. list 0) for averaging with other MVs.

Average Candidate Derived From Candidates With A Same Reference Picture In some embodiments, an average candidate is derived as a mean value of multiple MVs pointing to a same reference picture. For example, a video encoder or decoder searches every pair of motion candidates in the candidate list based on a predefined order. An average candidate can be generated if the two motion candidates in the pair have MVs pointing to a same reference picture in at least one list; otherwise, an average candidate is not generated from this pair of motion candidates. The process to derive average candidates continues until all the possible pairs have been searched or the candidate set is fully filled in. A specific embodiment of the video encoder or decoder derives an average candidate only when bi-predictive motion candidates in the pair having MVs pointing to the same reference picture in both lists, or when uni-predictive motion candidates in the pair having MVs pointing to the same reference picture in the given list. In another embodiment, an average candidate may also be derived when MVs of the motion candidates in the pair pointing to the same reference picture in only one list. If both motion candidates in the pair are bi-predictive motion candidates with same reference picture in only one list, the average candidate may be a uni-predictive motion candidate with a MV in one list; or the average candidate may be a bi-predictive motion candidate. The MV of the average candidate in another list may be generated by directly averaging the MVs of motion candidates without scaling in another list, or scaling one or both of the MVs of motion candidates in another list to the same reference picture then averaging the scaled MVs. If one motion candidate in the pair is a uni-predictive motion candidate and has no MV in list X (X=0 or 1), the MV and reference picture of the average candidate in list X may be set to equal to the MV and reference picture in list X of the other motion candidate in the pair, or the resulting average candidate is a uni-predictive motion candidate having no MV in list X.

An exemplary process of deriving average candidates includes searching all possible pairs in a predefined order to find if there are two candidates with MVs pointing to a first target reference picture (e.g. reference index 0) in at least one list. If the candidate set is not fully filled in, the process continues to search all possible pairs that have MVs pointing to a second target reference picture (e.g. reference index 1), a third target reference picture (e.g. reference index 2), and so on.

In one specific embodiment, an average candidate is not derived if the same reference picture pointed by the two motion candidates is far away from a given target reference picture of the average candidate.

Scaling In the above embodiments, MVs pointing to a reference picture different from the reference picture of the average candidate are not scaled before averaging to reduce the computational complexity. However, in some other embodiments, a MV may be scaled before averaging if the MV is pointing to a different reference picture. For example, an average candidate is derived from a first candidate and a second candidate, and the list 0 reference picture index of the average candidate is set to equal to the list 0 reference picture index of the first candidate, the list 0 MV of the second candidate is therefore scaled to the list 0 reference picture of the first candidate. The list 0 MV of the average candidate is derived by averaging of the list 0 MV of the first candidate and the scaled list 0 MV of the second candidate. In another example, the list 0 reference picture index of the average candidate is set to equal to the list 0 reference picture index of the second candidate. The list 0 MV of the first candidate scaled to the list 0 reference picture index of the second candidate before averaging with the list 0 MV of the second candidate.

Both the MVs are scaled to a target reference picture when the reference picture of the average candidate is set to the target reference picture according to another embodiment. The target reference picture of the average candidate is predefined, or explicitly transmitted in the video bitstream, or implicitly derived from the group of motion candidates. For example, the target reference picture index of the average candidate is derived as the minimum value of the reference picture indexes of the motion candidates.

In the above embodiments, if any motion candidate for deriving an average candidate has no MV in one list (e.g. list 0), an embodiment of the video encoder or decoder scales the MV in another list (e.g. list 1) to a target reference picture of the average candidate before averaging.

The MV scaling technique is well known in the art. For example, scaling can be based on the picture order count (POC) distance.

Reducing Complexity MVs are two dimensional vectors representing motion between a target block and a reference block, where each MV has a horizontal component and a vertical component. An embodiment of simplifying the average candidate derivation only averages one component of MVs. For example, only horizontal components of the MVs of motion candidates are averaged as the horizontal component of the MV of the new average candidate. The vertical component of the MV of the new average candidate is directly set to the vertical component of one of the MVs of the motion candidates.

Another embodiment of simplifying the derivation of average candidates only calculates the mean value of MVs in one list for the average candidate, while the MV of the average candidate in another list is directly set to the MV of one candidate in another list.

Position In Candidate Set The proposed average candidate may be added in any position in the candidate set. The last position shown in FIG. 3 and FIG. 5 or the last two positions shown in FIG. 4 and FIG. 6 are just examples for demonstration. In one example, when there are two empty positions in a candidate set, an average candidate is added before a zero candidate but after the spatial and temporal candidates. In another example, an average candidate is derived as a mean motion vector from a group of all available spatial candidates, and this average candidate is added in the candidate set after the spatial candidates but before the temporal candidate.

Rounding The averaging process of the aforementioned methods can be done with different rounding mechanism such as "rounding half up", "rounding half down", "rounding toward zero", "rounding away from zero" and any other means to replace the average value with another representation to fit in the limited bit-depth representation.

Redundancy Check One or more generated average candidates may also be compared to the other candidates in the candidate set to check for redundancy. If the average candidate is identical to one of the original candidates, it will not be included in the candidate set. An average candidate may be included in the candidate set before or after a pruning process.

Weighted Average The average candidate in the proposed method can be computed by even weighted averaged calculation or different weighted averaged calculation. For example, for a pair of motion candidates to generate an average candidate, the weights are 1 and 1, and the sum of each component of MVs is divided by 2. The weights for the two motion candidates can be 2 and −1 or −1 and 2 to avoid division, and the sum of each component of MVs of the motion candidates is the MV of the average candidate. More generally, the weights for multiple motion candidates are N1, N2, . . . Nn and then the sum is divided by (N1+N2+ . . . +Nn).

In an example of different weighted average calculation, a large weighting factor is assigned to the MV pointing to a given target reference picture while a small weighting factor is assigned to the MV pointing to another reference picture. In another example of different weighted average calculation, a large weighting factor is assigned to the MV of a spatial candidate while a small weighting factor is assigned to the MV of a temporal candidate. Spatial and temporal candidates may have larger weighting factors compare to affine candidates according to another embodiment.

Figure 7:
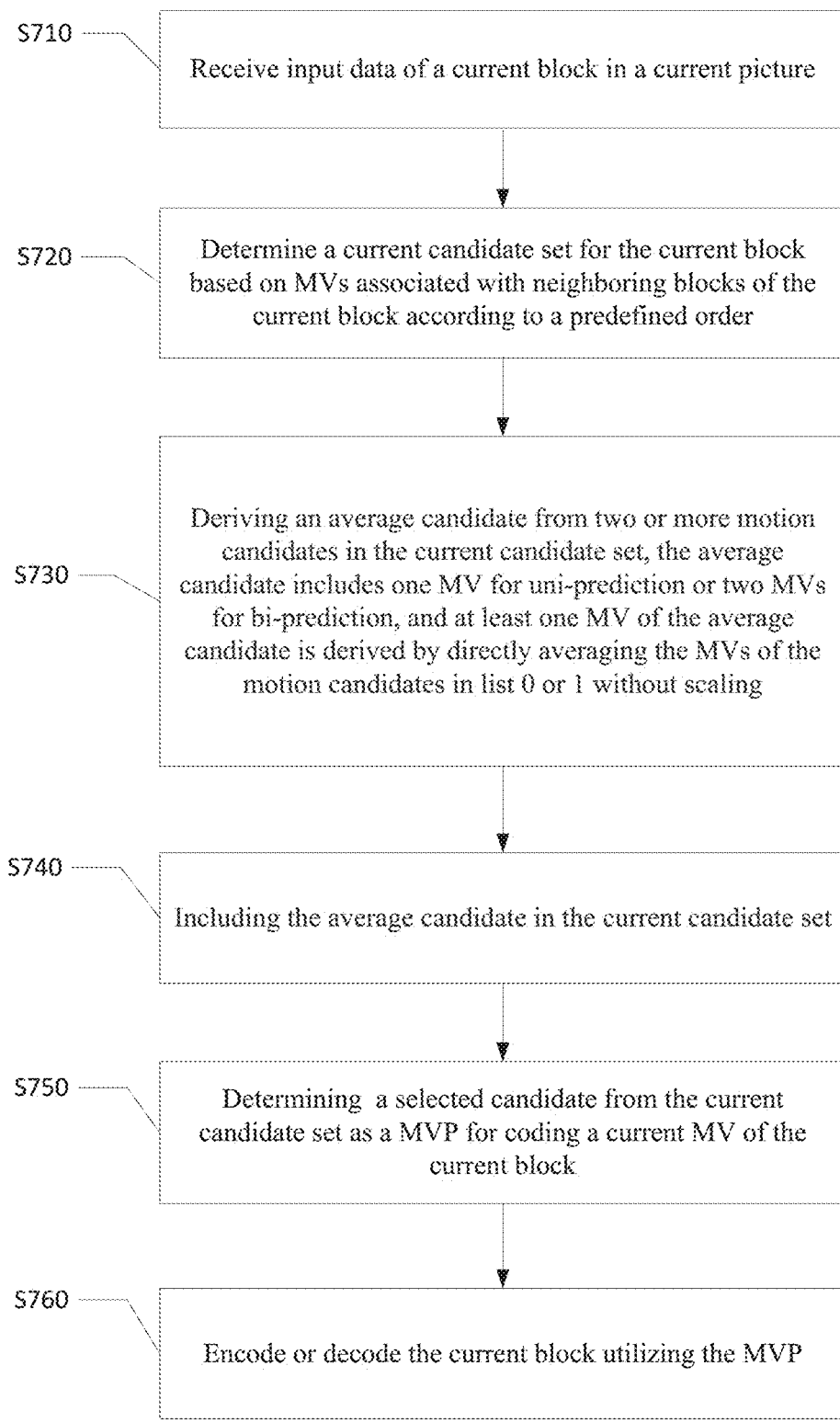
FIG. 7 is a flow chart illustrating an embodiment of the video coding system for processing a current block coded in inter picture prediction by deriving an average candidate from two or more existing candidates in a candidate set.

Exemplary Flowchart FIG. 7 illustrates an exemplary flowchart of a video encoding or decoding system for processing a block by constructing a candidate set according to an embodiment of the present invention. An average candidate is derived from two or more original motion candidates in the candidate set, and a final candidate is selected from the candidate set to encode or decode a current block coded in inter picture prediction mode such as Inter, Merge, or Skip mode. At an encoder side, the final candidate is selected by an encoder algorithm such as rate-distortion optimization (RDO), whereas at a decoder side, the final candidate may be selected by an index signaled in the video bitstream. The current block reuses motion information of the final candidate for motion prediction or motion compensation. The video encoding or decoding system receives input data associated with a current block in a current picture in Step S710. At the encoder side, the input data corresponds to pixel data to be encoded. At the decoder side, the input data corresponds to coded data or prediction residual to be decoded. In Step S720, a current candidate set is derived for the current block based on MVs associated with spatially and temporally neighboring blocks of the current block according to a predefined order. An average candidate is derived from two or more motion candidates in the candidate set in Step S730. The average candidate includes one MV for uni-prediction or two MVs for bi-prediction, and at least one MV is calculated by directly averaging the MVs of the motion candidates in one of list 0 and list 1 without scaling. The video encoding or decoding system includes this average candidate in the current candidate set in Step S740, and determines a selected candidate from the current candidate set as a MVP for a current MV of the current block in Step S750. In Step S760, the current block is encoded or decoded utilizing the MVP in inter picture prediction such as Inter, Merge, or Skip mode. A MV difference (MVD) between the MVP and the current MV respectively along with an index indicating the MVP and prediction residual of the current block are signaled for the current block if the current block is coded in Inter mode. The index indicating the MVP and prediction residual of the current block are signaled for the current block if the current block is coded in Merge mode. If the current block is coded in Skip mode, only the index indicating the MVP is signaled for the current block.

Figure 8:
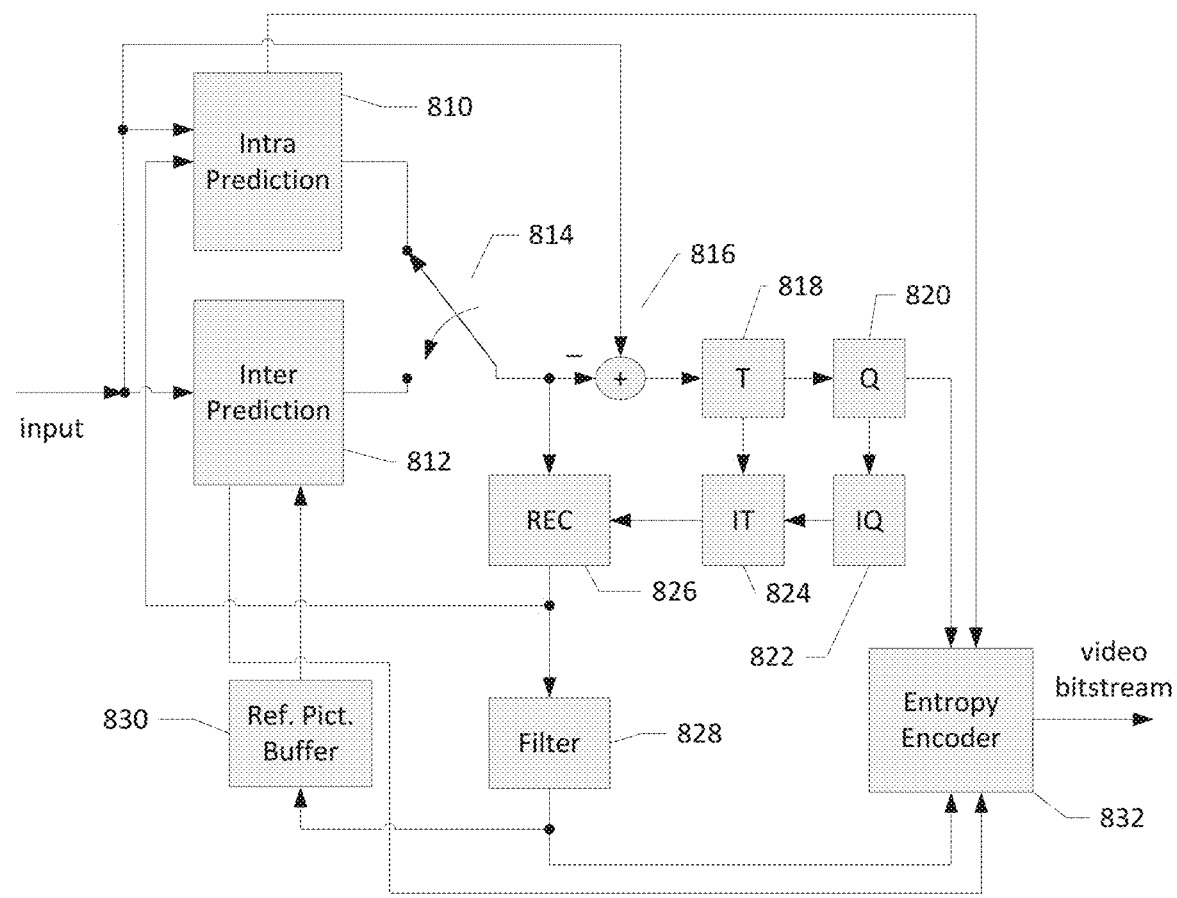
FIG. 8 illustrates an exemplary system block diagram for a video encoding system incorporating the video processing method according to embodiments of the present invention.

The foregoing proposed video processing methods for generating one or more average candidates to be added in a candidate set can be implemented in video encoders or decoders. For example, a proposed video processing method is implemented in an inter prediction module of an encoder, and/or an inter prediction module of a decoder. Alternatively, any of the proposed methods is implemented as a circuit coupled to the inter prediction module of the encoder and/or the inter prediction module of the decoder, so as to provide the information needed by the inter prediction module. FIG. 8 illustrates an exemplary system block diagram for a Video Encoder 800 implementing various embodiments of the present invention. Intra Prediction 810 provides intra predictors based on reconstructed video data of a current picture. Inter Prediction 812 performs motion estimation (ME) and motion compensation (MC) to provide inter predictors based on video data from other picture or pictures. To encode a current block in inter picture prediction such as Inter, Merge or Skip mode according to some embodiments of the present invention, a candidate set for encoding the current block with a current MV is constructed by including an average candidate. The average candidate is derived from two or more original motion candidates, and at least one MV of the average candidate is derived as a mean value of the MVs of the two or more motion candidates in one of list 0 and list 1. The MV of the average candidate is derived directly from averaging the MVs of the two or more motion candidates without scaling. The Inter Prediction 812 determines a selected candidate from the candidate set as a MVP for the current MV of the current block to locate a predictor. Either Intra Prediction 810 or Inter Prediction 812 supplies the selected predictor to Adder 816 to form prediction errors, also called prediction residual. There is no prediction residual if the current block is coded in Skip mode. The prediction residual of the current block are further processed by Transformation (T) 818 followed by Quantization (Q) 820. The transformed and quantized residual signal is then encoded by Entropy Encoder 832 to form a video bitstream. The video bitstream is then packed with side information. The transformed and quantized residual signal of the current block is processed by Inverse Quantization (IQ) 822 and Inverse Transformation (IT) 824 to recover the prediction residual. As shown in FIG. 8, the prediction residual is recovered by adding back to the selected predictor at Reconstruction (REC) 826 to produce reconstructed video data. The reconstructed video data may be stored in Reference Picture Buffer (Ref. Pict. Buffer) 830 and used for prediction of other pictures. The reconstructed video data recovered from REC 826 may be subject to various impairments due to encoding processing; consequently, In-loop Processing Filter 828 is applied to the reconstructed video data before storing in the Reference Picture Buffer 830 to further enhance picture quality.

Figure 9:
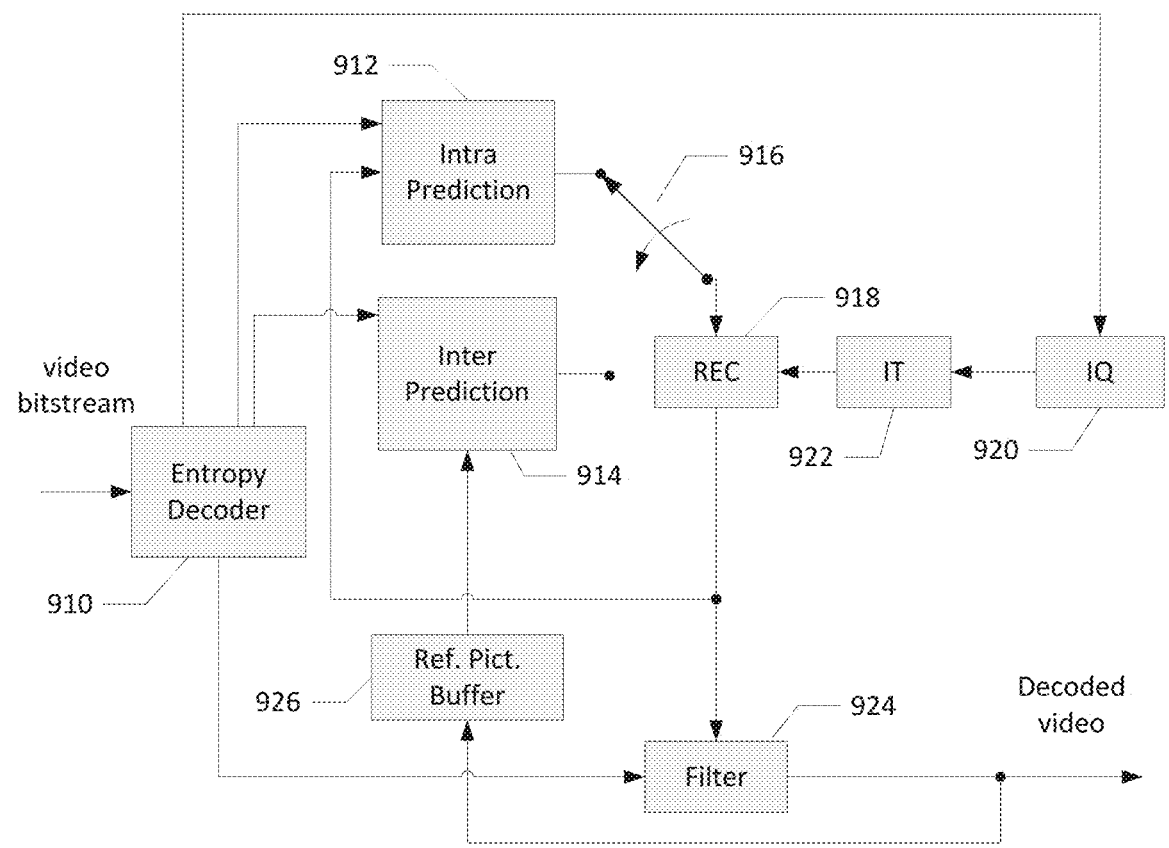
FIG. 9 illustrates an exemplary system block diagram for a video decoding system incorporating the video processing method according to embodiments of the present invention.

A corresponding Video Decoder 900 for decoding the video bitstream generated from the Video Encoder 800 of FIG. 8 is shown in FIG. 9. The video bitstream is the input to Video Decoder 900 and is decoded by Entropy Decoder 910 to parse and recover the transformed and quantized residual signal and other system information. The decoding process of Decoder 900 is similar to the reconstruction loop at Encoder 800, except Decoder 900 only requires motion compensation prediction in Inter Prediction 914. Each block is decoded by either Intra Prediction 912 or Inter Prediction 914. Switch 916 selects an intra predictor from Intra Prediction 912 or an inter predictor from Inter Prediction 914 according to decoded mode information. Inter Prediction 914 of some embodiments constructs a candidate set for a current block including an average candidate derived from two or more original motion candidates. At least one MV of the average candidate is derived as a mean value of the MVs of the motion candidates in one of list 0 and list 1. The MV of the average candidate is derived directly from averaging the MVs of the two or more original motion candidate without scaling. For example, a current candidate set comprises two spatial candidates and one temporal candidate, and an average candidate is derived by directly averaging the two spatial candidates without scaling regardless whether the two spatial candidates having MVs pointing to the same or different reference pictures. Inter Prediction 914 derives a predictor for the current block by selecting one final candidate from the candidate set including the average candidate. The transformed and quantized residual signal associated with each block is recovered by Inverse Quantization (IQ) 920 and Inverse Transformation (IT) 922. The recovered residual signal is reconstructed by adding back the predictor in REC 918 to produce reconstructed video. The reconstructed video is further processed by In-loop Processing Filter (Filter) 924 to generate final decoded video. If the currently decoded picture is a reference picture for later pictures in decoding order, the reconstructed video of the currently decoded picture is also stored in Ref. Pict. Buffer 926.

Various components of Video Encoder 800 and Video Decoder 900 in FIG. 8 and FIG. 9 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 800 and Decoder 900, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 8 and 9, Encoder 800 and Decoder 900 may be implemented in the same electronic device, so various functional components of Encoder 800 and Decoder 900 may be shared or reused if implemented in the same electronic device.

Embodiments of the video processing method for encoding or decoding may be implemented in a circuit integrated into a video compression chip or program codes integrated into video compression software to perform the processing described above. For examples, determining of a candidate set including an average candidate for coding a current block may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video processing in a video coding system, the method comprising:
receiving input data associated with a current block in a current picture;
deriving a current candidate set for the current block based on motion candidates associated with one or more neighboring blocks of the current block, wherein each motion candidate in the current candidate set includes
  (i) one motion vector (MV) pointing to a reference picture associated with list 0 or list 1 for uni-prediction, or
  (ii) one MV pointing to a reference picture associated with list 0 and another MV pointing to a reference picture associated with list 1 for bi-prediction;
deriving a derived candidate from at least two motion candidates in the current candidate set;
including the derived candidate in the current candidate set;
determining, from the current candidate set, one selected candidate as a motion vector predictor (MVP) for a current MV of the current block; and
encoding or decoding the current block in inter picture prediction utilizing the MVP,
wherein the deriving the derived candidate comprises, in a case that the derived candidate is derived from a first motion candidate that is a bi-predictive motion candidate having a first MV in a first list and a second MV in a second list and from a second motion candidate that is a uni-predictive motion candidate having a third MV in the first list, and the first MV and the third MV pointing to different reference pictures:
  setting an average of the first MV and the third MV without scaling as a first derived MV of the derived candidate in the first list; and
  setting the second MV as a second derived MV of the derived candidate in the second list, and
wherein the first list and the second list correspond to the list 0 and the list 1 respectively, or the list 1 and the list 0 respectively.

2. The method of claim 1, wherein the deriving the derived candidate comprises, in a case that the derived candidate is derived from the second motion candidate and a third motion vector that is another uni-predictive motion candidate having a fourth MV in the first list, and the third MV and the fourth MV pointing to different reference pictures:
  setting an average of the third MV and the fourth MV without scaling as the first derived MV of the derived candidate in the first list.

3. The method of claim 1, wherein the deriving the derived candidate comprises, in a case that the derived candidate is derived from the first motion candidate and a fourth motion vector that is another bi-predictive motion candidate having a fifth MV in the first list and a sixth MV in the second list:
  setting an average of the first MV and the fifth MV without scaling as the first derived MV of the derived candidate in the first list; and
  setting an average of the second MV and the sixth MV without scaling as the second derived MV of the derived candidate in the second list.

4. The method of claim 1, wherein
the first derived MV of the derived candidate in the first list points to one of the different references pictures to which the first MV and the third MV point.

5. The method of claim 1, wherein
the first derived MV of the derived candidate in the first list points to a target reference picture, and
a target reference picture index of the target reference picture is predefined, explicitly transmitted in a video bitstream, or implicitly derived from the first MV and the third MV.

6. The method of claim 1, wherein the deriving the derived candidate comprises, in a case that the derived candidate is derived from the second motion candidate and a third motion vector that is another uni-predictive motion candidate having a fourth MV in the first list, and the third MV and the fourth MV pointing to different reference pictures:
  setting an average of the third MV and the fourth MV without scaling as the first derived MV of the derived candidate in the first list; and
  setting the average of the third MV and the fourth MV without scaling as the second derived MV of the derived candidate in the second list.

7. The method of claim 1, wherein said at least two motion candidates include a group of all spatial candidates, a group of all temporal candidates, a group of all affine candidates, or a combination thereof.

8. The method of claim 1, wherein
said at least two motion candidates are selected from the current candidate set with a MV pointing to a target reference picture, and
a target reference picture index of the target reference picture is predefined, explicitly transmitted in a video bitstream, or implicitly derived from motion candidates of the current candidate set.

9. The method of claim 1, wherein the setting the average of the first MV and the third MV without scaling as the first derived MV of the derived candidate comprises calculating the average using "rounding half up", "rounding half down", "rounding toward zero", "rounding away from zero" to fit in limited bit-depth representation.

10. The method of claim 1, further comprising, in a case that the current candidate set is not full, deriving another derived candidate from a candidate pairs candidate pair in the current candidate set pointing to a same reference picture in at least one of the first list and the second list.

11. The method of claim 1, wherein the setting the average of the first MV and the third MV without scaling as the first derived MV of the derived candidate comprises calculating the average by weighted averaging the first MV and the third MV.

12. The method of claim 11, wherein a weighting factor assigned to a motion candidate for deriving the derived candidate is associated with a reference picture of the motion candidate with respect to a target reference picture of the derived candidate.

13. The method of claim 11, wherein a weighting factor assigned to a spatial candidate for deriving the derived candidate is different from a weighting factor assigned to a temporal candidate.

14. An apparatus of video processing in a video coding system, the apparatus comprising one or more electronic circuits configured to:
  receive input data associated with a current block in a current picture;
  derive a current candidate set for the current block based on motion candidates associated with one or more neighboring blocks of the current block, wherein each motion candidate in the current candidate set includes
    (i) one motion vector (MV) pointing to a reference picture associated with list 0 or list 1 for uni-prediction, or
    (ii) one MV pointing to a reference picture associated with list 0 and another MV pointing to a reference picture associated with list 1 for bi-prediction;
  derive a derived candidate from at least two motion candidates in the current candidate set;

include the derived candidate to the current candidate set;
determine, from the current candidate set, one selected candidate as a motion vector predictor (MVP) for a current MV of the current block; and
encode or decode the current block in inter picture prediction utilizing the MVP,
wherein the one or more electronic circuits are configured to derive the derived candidate by, in a case that the derived candidate is derived from a first motion candidate that is a bi-predictive motion candidate having a first MV in a first list and a second MV in a second list and from a second motion candidate that is a uni-predictive motion candidate having a third MV in the first list, and the first MV and the third MV pointing to different reference pictures:
  setting an average of the first MV and the third MV without scaling as a first derived MV of the derived candidate in the first list; and
  setting the second MV as a second derived MV of the derived candidate in the second list, and
wherein the first list and the second list correspond to the list 0 and the list 1 respectively, or the list 1 and the list 0 respectively.

15. A non-transitory computer readable medium storing program instruction causing a processing circuit of an apparatus to perform video processing method in a video coding system, and the method comprising:
receiving input data associated with a current block in a current picture;
deriving a current candidate set for the current block based on motion candidates associated with one or more neighboring blocks of the current block, wherein each motion candidate in the current candidate set includes
  (i) one motion vector (MV) pointing to a reference picture associated with list 0 or list 1 for uni-prediction, or
  (ii) one MV pointing to a reference picture associated with list 0 and another MV pointing to a reference picture associated with list 1 for bi-prediction;
deriving a derived candidate from at least two motion candidates in the current candidate set;
including the derived candidate to the current candidate set;
determining, from the current candidate set, one selected candidate as a motion vector predictor (MVP) for a current MV of the current block; and
encoding or decoding the current block in inter picture prediction utilizing the MVP,
wherein the deriving the derived candidate comprises, in a case that the derived candidate is derived from a first motion candidate that is a bi-predictive motion candidate having a first MV in a first list and a second MV in a second list and from a second motion candidate that is a uni-predictive motion candidate having a third MV in the first list, and the first MV and the third MV pointing to different reference pictures:
  setting an average of the first MV and the third MV without scaling as a first derived MV of the derived candidate in the first list; and
  setting the second MV as a second derived MV of the derived candidate in the second list, and
wherein the first list and the second list correspond to the list 0 and the list 1 respectively, or the list 1 and the list 0 respectively.

16. The apparatus of claim 14, wherein
said at least two motion candidates are selected from the current candidate set with a MV pointing to a target reference picture, and
a target reference picture index of the target reference picture is predefined, explicitly transmitted in a video bitstream, or implicitly derived from motion candidates of the current candidate set.

17. The apparatus of claim 14, wherein
the first derived MV of the derived candidate in the first list points to one of the different references pictures to which the first MV and the third MV point.

18. The apparatus of claim 14, wherein
the first derived MV of the derived candidate in the first list points to a target reference picture, and
a target reference picture index of the target reference picture is predefined, explicitly transmitted in a video bitstream, or implicitly derived from the first MV and the third MV point.

19. The non-transitory computer readable medium of claim 15, wherein
the first derived MV of the derived candidate in the first list points to one of the different references pictures to which the first MV and the third MV point.

20. The non-transitory computer readable medium of claim 15, wherein
the first derived MV of the derived candidate in the first list points to a target reference picture, and
a target reference picture index of the target reference picture is predefined, explicitly transmitted in a video bitstream, or implicitly derived from the first MV and the third MV point.

* * * * *